United States Patent
Baudu et al.

[11] Patent Number: 5,967,460
[45] Date of Patent: Oct. 19, 1999

[54] PIVOTING DOOR THRUST REVERSER WITH ACTUATING MECHANISM

[75] Inventors: Pierre André Marcel Baudu, Le Havre; Xavier Raymond Yves Lore, Beuzeuille la Grenier, both of France

[73] Assignee: Societe Hispano-Suiza, Paris, France

[21] Appl. No.: 08/942,912

[22] Filed: Oct. 2, 1997

[30] Foreign Application Priority Data

Oct. 3, 1996 [FR] France .................................. 9612046

[51] Int. Cl.⁶ ........................................................ F02K 1/70
[52] U.S. Cl. .................................. 244/110 B; 239/265.29; 60/226.2
[58] Field of Search ............................... 244/110 B, 12.5; 239/265.27, 265.29, 265.31, 265.19; 60/226.2, 230, 229

[56] References Cited

U.S. PATENT DOCUMENTS

| | | |
|---|---|---|
| 3,279,182 | 10/1966 | Helmintoller . |
| 3,605,411 | 9/1971 | Maison et al. . |
| 4,485,970 | 12/1984 | Fournier et al. . |
| 4,894,985 | 1/1990 | Dubois et al. . |
| 5,230,213 | 7/1993 | Lawson . |
| 5,243,817 | 9/1993 | Matthias . |
| 5,297,387 | 3/1994 | Carimali . |
| 5,785,249 | 7/1998 | Metzeau et al. .................... 244/110 B |

FOREIGN PATENT DOCUMENTS

| | | |
|---|---|---|
| 0 067 747 | 12/1982 | European Pat. Off. . |
| 1482538 | 5/1967 | France . |
| 2030034 | 10/1970 | France . |
| 2 618 853 | 2/1989 | France . |
| 2 680 547 | 2/1993 | France . |

*Primary Examiner*—Galen L. Barefoot
*Attorney, Agent, or Firm*—Bacon & Thomas PLL

[57] ABSTRACT

An actuating mechanism is disclosed for a thrust reverser of a turbojet engine having an engine cowling with a reverse thrust opening, a thrust reverser door pivotally connected to the engine cowling so as to pivot between forward and reverse thrust positions, and a linear actuator having a casing with an extendable and retractable piston rod. The piston rod is connected to the thrust reverser by a first connection forming a first connection point. An interface bracket is fixedly attached to the turbojet engine structure and engages a mounting flange in a connector affixed to the actuator casing at a second connection point, the mounting flange being in contact with the interface bracket at a third connection point, the first, second and third connection points lying in a straight line.

5 Claims, 2 Drawing Sheets

PIVOTING DOOR THRUST REVERSER WITH ACTUATING MECHANISM

BACKGROUND OF THE INVENTION

The present invention relates to an actuating mechanism for a pivoting door thrust reverser for a turbojet engine.

Turbofan-type turbojet engines are well known in the art and typically comprise a fan at the front of the turbojet engine which directs a flow of bypass air through a duct bounded by the engine cowling on the inside and a fan cowling on the outside. The generally annular duct bounded by the engine cowling and the fan cowling may channel both the bypass flow and the primary exhaust gas flow at a downstream portion or may channel only the bypass flow.

In aircraft on which the turbojet engine is mounted outside of the airframe structure, the fan cowling and the engine cowling are configured to form boundaries of the bypass flow duct and to provide aerodynamic outer surfaces to reduce drag.

FIG. 1 illustrates a known pivoting door-type thrust reverser associated with the cowling of a turbojet engine. As illustrated, the forward portion of the fan cowling 1 defines the outer limits of the bypass flow duct and is generally concentrically arranged about the turbojet engine (not shown). The cowling 1 comprises an external cowling panel and an internal cowling panel interconnected by a front frame 6. The outer surface of the external cowling panel has an aerodynamic surface over which the air external to the engine passes during aircraft flight. The inner surface of the inner cowling panel defines the outer boundary of a gas flow duct.

The cowling also comprises a thrust reverser comprising a door 7 pivotally attached to the cowling such that it is movable between a closed, forward thrust position, illustrated in FIG. 1, and an open, reverse thrust position in which the upstream end (towards the left as viewed in FIG. 1) of the thrust reverser door 7 is moved outwardly from the cowling, while a downstream portion is moved inwardly into the gas flow duct airstream so as to redirect at least a portion of the gas flow through an opening in the cowling in a direction that has a reverse thrust component.

An actuator 4 for moving the door 7 between its forward and reverse thrust positions may comprise an actuating cylinder mounted to the front frame 6, and have an extendable and retractable piston rod connected to the thrust reverser door 7.

The upstream end 11 of the door 7 may have a deflector 13 to maximize the efficiency of the thrust reverser when the door 7 is in the reverse thrust position. When the door is in the forward thrust position, as illustrated in FIG. 1, an outer surface panel is substantially flush with the external surfaces of the cowling. Door 7 may have a cavity or recess 12 to accommodate the actuator 4 when the door is in the forward thrust position.

A plurality of thrust reverser doors 7 may be incorporated into the cowling, such doors being circumferentially spaced around the periphery of the cowling. A portion of the cowling axially extends between forward and rear portions of the cowling between circumferentially adjacent thrust reverser doors 7 to provide structural rigidity to the fan cowling and to provide pivot mounting points for attaching the doors 7 to the fan cowling. French Patents 1,482,538 and 2,030,034 illustrate typical, known thrust reversers.

U.S. Pat. No. 3,605,411 discloses a pivoting door-type thrust reverser in which the deflector mounted on the upstream or forward end of the thrust reverser door is movable to an extended position when the door is in the reverse thrust position.

French Patent 2,618,853 discloses a thrust reverser in which the deflector is retracted when the door is in its forward thrust position to optimize engine performance.

In some applications, as illustrated in FIG. 1, the deflector 13 projects from the inner surface of the thrust reverser door 7 even when the door is in its forward thrust position without extending into the gas flow duct. This forms a cavity facing inwardly into the gas flow duct which will slightly degrade engine performance.

French Patent 2,680,547 discloses a thrust reverser having a combination of spoilers and deflectors to attempt to optimize the direction of exhaust flow.

French Patent 1,482,538 also illustrates that it is known to drive the thrust reverser door between its forward thrust position and reverse thrust position using a linear actuator in which each door is associated with one linear actuator affixed by its forward portion to the stationary portion of the cowling.

For engineering simplicity, the linear actuator may incorporate a locking function acting on the movable rod of the linear actuator to lock the thrust reverser door in the forward thrust position. Because of the travel of the rod, the location of the locking system may be either on the forward portion, or the rear portion of the actuator.

The length of the linear actuator is determined by the kinematics of the thrust reverser door, the loads imposed upon the door and the positioning of the locking system, the length generally being very large compared to the surrounding structural environment which requires the mounting of the linear actuator through the front frame of the stationary structure of the thrust reverser. Because of this location of the linear actuator, several structural problems arise. As illustrated in FIG. 1, in order not to interrupt the interfacing shroud between the thrust reverser and the engine, the linear actuator is placed in a radially intermediate zone of the front frame structure 6. The resulting force F1 of the linear actuator 4 on the thrust reverser door 7 and the distance L1 between the force and the engagement interface of the mounting flange 3 on the interface bracket 5 produces a large twisting torque MI on the front frame structure. A second problem is that the swivel mount allowing the linear actuator to swivel relative to the front frame 6 is located around the linear actuator body and mounted on the front frame 6, thereby necessitating a large aperture to be formed in the front frame 6. These two problems are significant and require reinforcing of the front frame 6. Such reinforcement increases the weight of the overall system and does not fully eliminate the twisting torque problem.

The positioning of the linear actuator also causes a third problem. The location of the actuating fluid supply and return lines, which may be flexible, are located forwardly of the front frame 6, close by the combustion chamber and high temperature areas of the jet engine, thereby raising the possibility of fire should any leaks occur.

SUMMARY OF THE INVENTION

An actuating mechanism is disclosed for a thrust reverser of a turbojet engine having an engine cowling with a reverse thrust opening, a thrust reverser door pivotally connected to the engine cowling so as to pivot between forward and reverse thrust positions, and a linear actuator having a casing with an extendable and retractable piston rod. The piston rod is connected to the thrust reverser by a first connection forming a first connection point. An interface bracket is fixedly attached to the turbojet engine structure and engages a mounting flange in a connector affixed to the actuator casing at a second connection point, the mounting flange being in contact with the interface bracket at a third connection point, the first, second and third connection points lying in a straight line.

By arranging the first, second and third connection points in a straight line, the force of the linear actuator passes through the connection point between the mounting flange and the interface bracket thereby completely eliminating any torque imposed on the front frame. The front portion of the linear actuator is either attached directly to the front frame in a radially inner position, or is attached to a separate bracket also located at a radially inner position relative to the front frame 6.

Elimination of the twisting torque applied to the front frame, as well as the elimination of the necessity for a large aperture in the front frame to accommodate the swivel mount of the actuator enables the front frame structure to be reduced in weight and bulk while maintaining adequate structural strength. Since the front portion of the stationary structure transmitting the linear actuator forces to a turbojet engine cowling may amount up to 30% of the total weight of the thrust reverser, such weight savings can be significant.

The first, second and third connection points are aligned in a straight line when the thrust reverser door is in a position requiring the largest force from the linear actuator. This may take place when the door is moving into the reverse thrust position, or into the forward thrust position, depending upon the individual design of the thrust reverser.

DETAILED DESCRIPTION OF THE PREFERRED EMBODIMENTS

Figure 2:
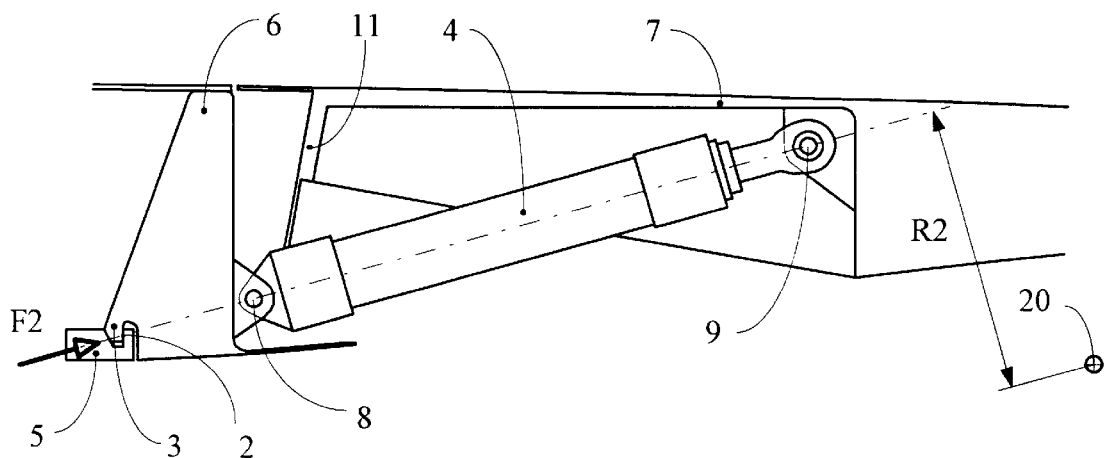
FIG. 2 is a partial, longitudinal, cross-sectional view of the thrust reverser actuator according to the present invention.
Figure 3:
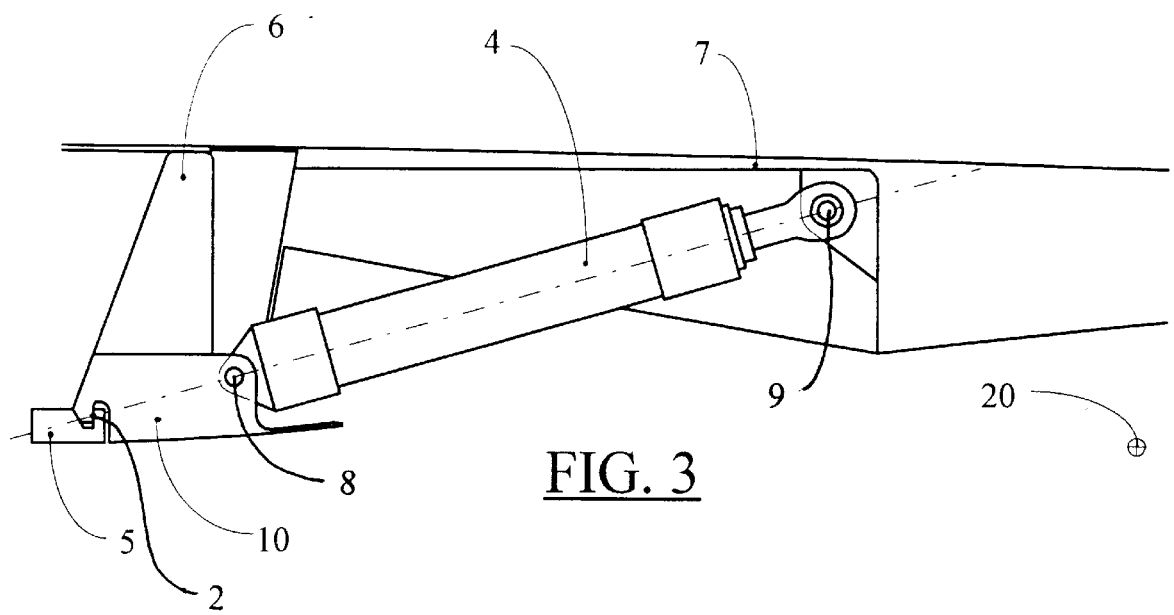
FIG. 3 is a view similar to FIG. 2, but illustrating an alternative embodiment of the thrust reverser actuator according to the present invention.

The thrust reverser actuating mechanism according to the present invention is best illustrated in FIGS. 2 and 3, wherein it can be seen that it is utilized with a pivoting thrust reverser door 7 movable between a forward thrust position (illustrated) and a reverse thrust position, wherein, as the door pivots about pivot axis 20 the front portion of the door 7 (towards the left as viewed in FIGS. 2 and 3) moves outwardly from the engine cowling, while a rear portion moves inwardly into a gas flow duct so as to redirect at least a portion of the gas flowing through the duct through an opening in the end cowling. A front frame 6 is located forwardly of the reverse thrust opening in the cowling. The front portion 11 of the thrust reverser door 7 may have a deflector 13 attached thereto, in known fashion, so as to improve the efficiency of the thrust reverser door when in the reverse thrust position.

A linear actuator 4 has an extendable and retractable piston rod with an end attached to the thrust reverser door 7 at a first connection defining a first connection point 9. In the embodiment illustrated in FIG. 2, the forward end portion of the linear actuator 4 is connected to the front frame 6 at a second connection point 8. The front frame 6 has a mounting flange 3 extending generally radially inwardly therefrom, which mounting flange 3 engages a groove formed in the interface bracket 5, fixedly attached to the turbojet engine structure. The engagement point between the mounting flange 3 and a rear wall of the interface bracket 5 bounding one side of the groove is illustrated at 2 and, as can be seen, the first, second and third connection points, 9, 8 and 2, respectively lie in a straight line. The third connection point 2, the mean force transmitting location, is considered to be located approximately at the mid point of the engagement surface between the mounting flange 3 and the interface bracket 5 on the rear facing surface of the mounting flange 3.

The connection points, 9, 8 and 2 are determined so as to be in linear alignment in the positions of the actuator 4 and the thrust reverser door 7 which requires the maximum force from the linear actuator 4. This may take place during the movement of the thrust reverser door from the forward thrust position to the reverse thrust position, or vice versa. The force parameters will, of course, be slightly different for each particular application of the thrust reverser door.

The connection point 8 on the casing of the linear actuator 4 may be connected directly to the front frame 6 as illustrated in FIG. 2, or may be connected to an independent connecting bracket 10, illustrated in FIG. 3. In this instance, the connecting bracket 10 has the mounting flange 3 formed thereon which engages the interface bracket 5 in the same fashion as the embodiment illustrated in FIG. 2.

Figure 1:
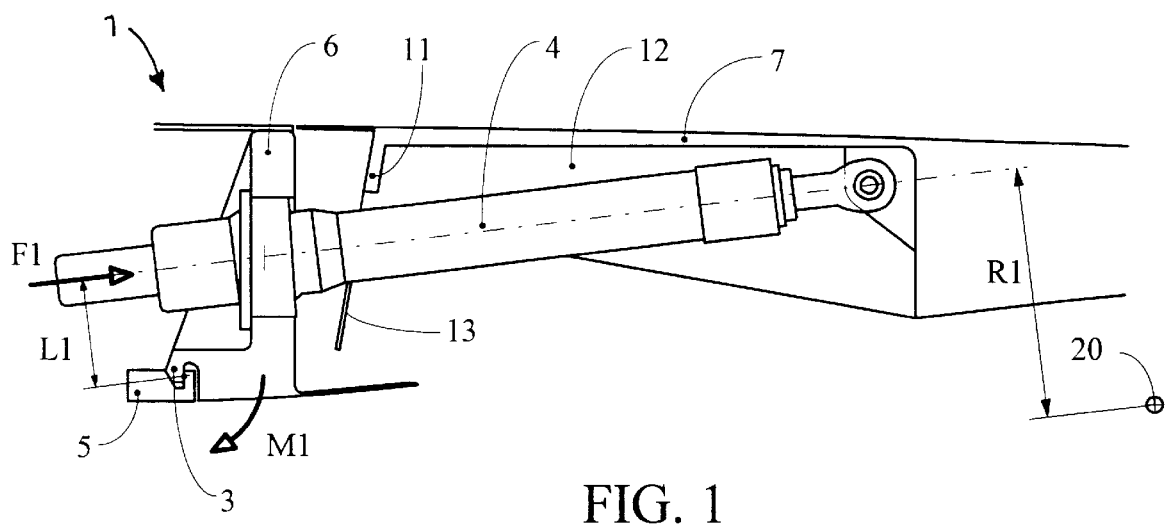
FIG. 1 is a partial, longitudinal cross-sectional view of a known thrust reverser with the pivoting thrust reverser door in the forward thrust position.

By positioning the attachment of the forward portion of the casing of the linear actuator 4 to the rear and adjacent to a radially innermost portion of the front frame 6, several advantages are achieved:

a) The flexible tubing supplying the actuating fluid 2 and returning the actuating fluid from the linear actuator 4 may be located outside of the high temperature area, thereby minimizing the possibility of fire should any leaks occur;

b) The front frame 6 may be lightened while maintaining structural strength thereby achieving a savings in weight;

c) A recess in the deflector 13 necessary to accommodate the linear actuator may be reduced in size, thereby improving the efficiency of the thrust reverser in the reverse thrust mode;

d) The forward part of the linear actuator 4 being outside of the cavity 12 formed in the thrust reverser door 7 enables the forward portion 11 of the door 7 to be strengthened;

e) If a movable deflector 13 is utilized, the recess to accommodate the linear actuator may be made smaller, thereby improving the structural strength of the deflector; and, f) For a given configuration, the distance R2 between the force F2 of the linear actuator and the pivot axis 20 of the door (illustrated in FIG. 2) is larger than the corresponding distance R1 in the known prior art devices, as illustrated in FIG. 1, enabling the lightening of the overall thrust reverser structure, thereby achieving a savings in weight.

Figure 4:
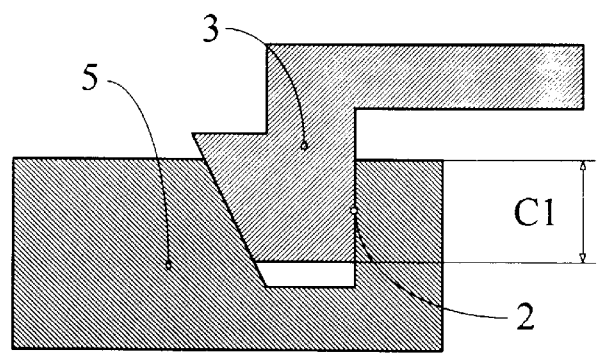
FIG. 4 is an enlarged, cross-sectional view illustrating the mounting flange and interface bracket of a known thrust reverser.

FIG. 4 illustrates, in detail, the engagement between the mounting flange 3 and the interface bracket 5. In this instance, the rear surface of the mounting flange 3 is generally planar in configuration and is in contact with a similarly planar surface of the interface bracket 5 along a distance C1. In this configuration, the connection point 2 is assumed to be at the center of the distance C1. Its actual location will depend upon the machining tolerances of the mounting flange 3 and the interface 5 and the actual contact may vary within the full range of the distance C1. Such a variance may entail changes in the force transmission to the mounting flange 3 by creating a torque between the theoretical alignment axis of the linear actuator 4 and the actual application of connection point 2 on the interface bracket 5.

Figure 5:
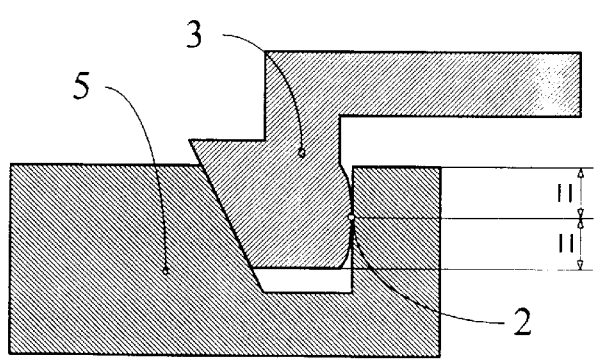
FIG. 5 is an enlarged, cross-sectional view illustrating the engagement of the mounting flange and the interface bracket according to the present invention.

To remedy this variance, applicant's invention forms the rear face of the mounting flange 3 in a non-planar configuration to insure that the connection point 2 will always be aligned with the connection points 8 and 9. As illustrated in FIG. 5, the rear surface of the mounting flange 3 may be generally convex in configuration.

The linear actuator utilized with applicant's invention may be either a linear actuator without any internal locking mechanism, or it may include any known type of internal locking mechanisms, and may be hydraulically, electrically, or pneumatically actuated. The invention may also be applied to a linear actuator mechanically actuating several thrust reverser doors, or for a linear actuator which is connected to only a single thrust reverser door 7.

The foregoing description is provided for illustrative purposes only and should note be construed as in any way limited this invention, the scope of which is defined solely by the appended claims.

We claim:

1. An actuating mechanism for a trust reverser for a turbojet engine having an engine cowling with at least one reverse thrust opening, at least one thrust reverser door pivotally connected to the engine cowling so as to pivotally move between forward and reverse thrust positions, the actuating mechanism comprising:
   a) a linear actuator having a casing with an extendable and retractable piston rod;
   b) first connection connecting the piston rod to the at least one thrust reverser door, the first connection forming a first connection point;
   c) an interface bracket fixedly attached to the turbojet engine structure; and,
   d) connector connected to the actuator casing at a second connection point, the connector having a mounting flange with an engagement surface in contact with the interface bracket at a third connection point, the third connection point lying on the engagement surface, whereby the engagement surface ensures that the first, second and third connection points always lie in a straight line such that the third connection point is substantially free of any torque from the linear actuator.

2. The actuating mechanism of claim 1 wherein the connector also comprises a front frame of the engine cowling located forwardly of the at least one reverse thrust opening.

3. The actuating mechanism of claim 1 wherein the engagement surface has a non-planar configuration.

4. The actuating mechanism of claim 1 wherein the engagement surface is convexly curved.

5. The actuating mechanism of claim 1 further comprising a groove in the interface bracket wherein the mounting flange engages the groove.

* * * * *